United States Patent Office 3,507,853
Patented Apr. 21, 1970

3,507,853
PRODUCTION AND RECOVERY OF METHYL α-D-MANNOPYRANOSIDE AND A MIXTURE OF PURE METHYL GLYCOSIDES
John Kelvin Hamilton and Franklin W. Herrick, Shelton, and Jim D. Wilson, Olympia, Wash., assignors to ITT Rayonier Incorporated, a corporation of Delaware
No Drawing. Filed Nov. 2, 1967, Ser. No. 680,020
Int. Cl. C07g 3/00
U.S. Cl. 260—210    9 Claims

ABSTRACT OF THE DISCLOSURE

A method is disclosed for producing a mixture of purified methyl glycosides from mannose-containing plant materials. The mixture is then separated into essentially pure methyl α-D-mannopyranoside and a complex residue of methyl glycosides. The plant material is glycosidated under anhydrous conditions at an elevated temperature with methanol containing an acid catalyst to convert carbohydrate materials in said plant material or extract into simple methyl glycosides. The hot acidic solution is then neutralized to a pH of about 7 and the alcohol-insoluble inorganic salts removed if desired. The neutral solution is then evaporated to a thick syrup, cooled below 50° C. and diluted with from 1 to 2 times its weight of water at about 55° C. Water-insoluble noncarbohydrates and other impurities are removed and the solution is decolorized with an adsorptive material such as activated carbon. A clear, light-colored solution of methyl glycosides results from which methyl α-D-mannopyranoside can be preferentially and readily crystallized leaving a complex residue of pure methyl glycosides as a second useful product.

BACKGROUND OF THE INVENTION

Both methyl α-D-mannopyranoside and the complex residue of mixture methyl glycosides formed as products of the invention can be utilized in resins, polyurethane foams, etc. In addition, methyl α-D-mannopyranoside can be readily converted to pure mannose and its derivatives such as mannitol which have broad and recognized utility in dietary supplements, resins, plastics, plasticizers, explosives and other useful products.

Plant materials from which the products of the invention can be prepared are abundant in nature. Examples of plant tissue containing substantial amounts of suitable carbohydrate material include such diverse items as ivory nuts, locust beans, coffee beans, guar seed, plant gums and exudates, and the wood of coniferous trees. Because of the complex composition of plant materials however, mannose and derivatives thereof have been difficult and relatively expensive to isolate and recover in reasonably pure form, a circumstance which has heretofore restricted their wide use in commerce. The pure methyl α-D-mannopyranoside of the present invention provides a new and relatively inexpensive source for such chemicals while the complex residue of mixed methyl glycosides also comprises a new and relatively inexpensive source of these substances.

While the process of our invention can be carried in conjunction with many types of plant-derived starting materials, it is particularly beneficially applied to those materials that are now discarded or at least considered of relatively little value. Especially desirable sources are the non-cellulosic carbohydrates extracted from coniferous wood chips during their conversion into high grade wood pulps and into hardboards by the so-called "Masonite" process. During such processes an early step is frequently a high pressure, high temperature steam or hot water pretreatment of the wood chips that solubilizes and removes substantial amounts of non-cellulosic carbohydrates which in the past have posed a serious disposal problem. Up to 85 percent of this extract is a mixture of wood sugars and lower molecular weight oligo- and polysaccharides containing substantial amounts of mannose and mannose polymers and consequently constitutes an almost ideal starting material for our invention. Another particularly useful starting material for the invention is the cold alkaline extract material removed from wood pulps during their refining and bleaching stages. Enormous quantities of such by-products are available for glycosidation at very low cost to provide essentially pure methyl α-D-mannopyranoside in good yields. In addition, the mixed methyl glycosides remaining after the removal of said methyl α-D-mannopyranoside also comprise an improved product useful, for example, in polyurethane foams, plasticizers and humectants.

SUMMARY OF THE INVENTION

As is well known to sugar chemists, the multiplicity of isomeric forms present in complex mixtures of sugars and their derivatives will normally prevent the use of crystallization as a practical means of separating out and recovering any one individual compound. This is particularly true where the diversity and complexity of the carbohydrate mixture is as great as that found in plant tissue and in extracts therefrom. The present invention is based on our discovery that, contrary to this general rule, we can separate and recover a substantially pure methyl mannoside product from a complex mixture of methyl glycosides derived from plant materials. Specifically, we have found that by conversion of the carbohydrates in a complex mixture thereof to methyl glycosides, followed by proper treatment and purification stages, we can obtain a solution of methyl glycosides from which the mannose-derived components can be preferentially crystallized as pure methyl α-D-mannopyranoside. We have also found that the complex residue of purified methyl glycosides that is left after removal of the mannoside is an improved product useful for many purposes.

More specifically, the plant-derived, carbohydrate-containing starting material is thoroughly dried and then reacted with methanol containing a mineral acid catalyst (preferably HCl or $H_2SO_4$) under essentially anhydrous conditions at a temperature between about 66° and 116° C. for about 15 to 300 minutes. In this reaction polysaccharides and simple sugars are converted to simple methyl glycosides. The acidic solution is then neutralized by a suitable method, such as by the addition of methanolic alkali or by treatment with anionic exchange resins, whereupon the alcohol-insoluble inorganic salts such as NaCl precipitate and preferably are removed. The neutral solution is then evaporated to a thick syrup, cooled to below 50° C., and diluted with water at a temperature of about 55° C. Water-insoluble, highly colored, non-carbohydrates and other water-insoluble impurities are then removed. Additional colored impurities can then be removed by means of an adsorptive material such as activated carbon leaving a light-colored aqueous solution of purified methyl glycosides. Contrary to what would ordinarily be expected, we have found that essentially pure methyl α-D-mannopyranoside can be preferentially crystallized from this complex mixture of methyl glycosides by either of two procedures. It can be crystallized from the aqueous solution concentrating it and cooling it to ambient temperature or below. Alternatively, substantially all the water can be removed from the aqueous solution by evaporation and the methyl glycosides redissolved in methanol or other polar solvents. The methyl α-D-mannopyranoside is then preferentially crystallized therefrom by cooling as before. With either procedure the residual complex of methyl glycosides left behind is a useful product.

DETAILED DESCRIPTION

As previously noted, the process of our invention can be used to recover two useful products from plant tissue and extracts thereof. Plant tissues such as coniferous woods are advantageously first extracted with steam or hot water to obtain a non-cellulosic extract of carbohydrates that is high in wood sugars and polysaccharides. Moreover, whenever the polysaccharide content of the starting material is sufficiently high, it is advantageous to subject said material to a preliminary hydrolysis step with dilute acid to break the polysaccharides down into free mannose and other simple sugars before glycosidation.

For successful glycosidation to take place the starting material must be dry. How it is best dried depends upon its nature. Some materials are easily dried in an oven while for others spray drying is preferable. For some materials however, neither oven or spray drying is feasible, and methods such as azeotropic distillation or lyophilization are required. Once dried, the starting material is reacted with anhydrous methanol containing a mineral acid catalyst such as HCl or $H_2SO_4$ at a temperature of from about 66° to 116° C., for from about 15 to 300 minutes to convert the carbohydrates to simple wood sugar glycosides. In general, the time required to substantially complete glycosidation of the sugars decreases with either an increase in the reaction temperature or an increase in the concentration of the acid catalyst. The weight ratio of anhydrous methanol to dried plant material is advantageously at least about 0.8:1, and the practical ranges for catalyst content of the methanol are from about 2 to 10 percent by weight of HCl and from about 5.4 to 26.0 percent by weight of $H_2SO_4$. High yields, for example, of methyl α-D-mannopyranoside have been obtained by heating a dried extract from coniferous wood chips for 15 to 20 minutes at about 90° C. with anhydrous methanol containing 6 percent HCl by weight.

Upon completion of glycosidation, excess acid in the methanolic reaction solution is neutralized advantageously to a pH of about 7 by treatment with a suitable agent such as a methanolic solution of an alkali of a metal hydroxide or with an anion exchange resin. Alcohol insoluble inorganic salts such as NaCl can be removed at this point, if desired. The neutral methanolic solution is then evaporated to a thick syrup, cooled to below about 50° C., and converted to an aqueous mixture by the addition of from one to two volumes of water at about 55° C. Water-insoluble non-carbohydrates and other impurities fail to dissolve or are precipitated, and these impurities can then be removed by filtration. These water-insoluble, highly-colored carbohydrates and other impurities normally amount to about 7 to 12 percent based on the weight of the solids in the starting material when it is an aqueous extract of coniferous wood.

The removal of water-insoluble impurities in the foregoing process step is very important in that this water-insoluble fraction is composed of highly colored, interfering material which, if left in the methanol solution, would be difficult to remove with decolorizing carbon and would contaminate any crystalline product derived from the methanol solution of glycosides. Furthermore, this water-insoluble material was originally water soluble prior to the glycosidation reaction. Discovery of the change in solubility of this fraction and its easy removal by means of the foregoing process step is a major advantage in the production of pure methyl α-D-mannopyranoside by the process of our invention, and it is also of especial significance with regard to the recovery of a purified light-colored mixed glycoside product.

Following the removal of the water-insoluble fraction, the clarified solution of methyl glycosides is then decolorized by addition of an adsorptive material such as activated carbon. The resultant neutral aqueous solution contains essentially only a mixture of methyl glycosides.

Pure methyl α-D-mannopyranoside can be preferentially crystallized from the purified solution of methyl glycosides by either of two procedures. First, the aqueous solution itself can be partially concentrated and cooled to ambient temperatures or below, whereupon pure methyl α-D-mannopyranoside will preferentially crystallize therefrom. Alternatively, the purified aqueous solution of methyl glycosides can be substantially dehydrated (as by evaporation) and converted to an alcoholic solution. The alcoholic solution is concentrated if necessary and then is cooled to ambient temperatures or below, whereupon pure methyl α-D-mannopyranoside will preferentially crystallize for recovery in good yield. Which of these procedures will be preferable in a given situation will depend upon the composition and nature of the solution of mixed methyl glycosides being treated. Yields as high as 50 to 75 percent based on the mannose theoretically present in the starting material are readily obtained. Thus when a starting material contains around 40 percent mannose, as frequently happens, it is possible to obtain yields of pure methyl α-D-mannopyranoside as high as 20 to 30 percent based on the weight of the starting material.

Regardless of whether the methyl α-D-mannopyranoside is crystallized from an aqueous or alcoholic solution, the mother liquor that remains will comprise a concentrated solution of mixed methyl glycosides which can be used as such to provide a second valuable and marketable product.

The following examples are illustrative but not limitative of the practice of our invention.

Example I

This example illustrates the preparation and analysis of a preferred raw material for use in the process of our invention. This material consists of by-product carbohydrates extracted from southern pine chips when they are given a high-pressure, hot aqueous treatment as the first stage of a pulping process. The aqueous extract is concentrated to contain approximately 40 to 70 percent total solids in an evaporator and then spray-dried to a fine brown powder having a caramel-like odor under the following conditions: inlet air temperature 310–330° F., outlet air temperature 168–186° F., and chamber temperature 196–208° F. A typical dry powdered product of this type had the sugar analysis shown in Table 1.

TABLE 1.—SUGAR ANALYSIS* OF SPRAY DRIED SOLIDS FROM AN AQUEOUS EXTRACT OF SOUTHERN PINE WOOD CHIPS

| Sugar | Percent Based on Oven-Dry Weight | |
|---|---|---|
| | Monomeric Sugars | Total Sugars* After Hydrolysis |
| Galactose | 3.0 | 9.2 |
| Glucose | 1.6 | 12.0 |
| Mannose | 3.5 | 38.4 |
| Arabinose | 3.2 | 2.5 |
| Xylose | 5.6 | 9.8 |
| Total Sugars | 16.9 | 71.9 |

*Determined by the method of Jeffery et al., Anal. Chem. 32, 1774 (1960). This analysis includes the monomeric and polymeric carbohydrates, the latter being determined in terms of their monomeric hydrolysis products.

Example II

This example illustrates the production of methyl α-D-mannopyranoside from a spray-dried aqueous extract of southern pine wood similar to that of Example I.

Samples (2500 grams) of the spray-dried extract were each glycosidated with 5 liters of methanol (0.06±0.01% H₂O) containing varying concentrations of HCl (adjusted to ±0.05% HCl) for the times and temperatures indicated in Table 2. The reaction vessel was a tantalum-lines steam heated tumbling autoclave.

In the glycosidation procedure the reagents were placed in the autoclave, thoroughly mixed, the autoclave sealed and started tumbling. The temperature was raised rapidly to the desired reaction temperature (5–17 minutes) and held at said temperature for the times indicated in the table. When the desired reaction time had elapsed 400 ml. samples of the reaction mixture were removed from the autoclave with a sampling device and weighed. The sample was then neutralized to pH 7 with a standard 4–5 N methanolic-KOH solution and evaporated at 50° C. to a thick syrup on a rotary evaporator. The syrup was dispersed with slight warming in water (200 ml.) and the water-insoluble material removed with vacuum filtration through No. 1 Whatman paper. (Although warming greatly facilitated the dissolution of the syrup in water, if the temperature rose much above 55° C. the water insolubles became sticky and filtration was virtually impossible.) The water-insoluble fraction was washed with water and the washings combined with the filtrate. After further washing the insoluble residue was vacuum dried at 50° C. and weighed. The pH (6.0–6.5) of the dark-brown combined filtrate was readjusted to 7.0 with 1 N potassium hydroxide, decolorized at its boiling point with activated carbon and filtered. The resulting yellow solution was then cooled and diluted to 500 ml. with water. The total solids of these solutions averaged about 25 percent. The reaction conditions used and the analysis of the results obtained thereby are set out in Table 2. (The various reaction conditions were selected to determine the effects of solvent-acid concentration (2–10% HCl), reaction temperature (66° to 116° C.) and reaction time (15–240 minutes) on the yield of methyl α-D-mannopyranoside using statistical analysis.)

TABLE 2.—GLYCOSIDATION OF SPRAY-DRIED SOLIDS FROM THE HOT AQUEOUS EXTRACT OF SOUTHERN PINE WOOD

| HCl, Conc., Percent | Temp., °C. | Time, mins. | Pressure, p.s.i. | Water Insoluble Solids, Percent of Original Solids | Methyl α-D-Mannopyranoside, Percent of Original Dry Solids [1] |
|---|---|---|---|---|---|
| 2.0 | 91 | 60 | 37 | 7.5 | 24.81 |
| 3.0 | 72 | 21.5 | 18 | 6.7 | 11.95 |
| 3.0 | 72 | 169 | 18 | 7.9 | 26.17 |
| 3.0 | 110 | 21.5 | 94 | 7.5 | 26.08 |
| 3.0 | 110 | 169 | 87 | 8.6 | [2] 28.37 |
| 6.0 | 66 | 60 | 14 | 8.2 | 26.79 |
| 6.0 | 91 | 15 | 53 | 9.1 | [2] 30.65 |
| 6.0 | 91 | 21.5 | 61 | 9.9 | [2] 29.45 |
| 6.0 | 91 | 60 | 60 | 9.9 | 28.56 |
| 6.0 | 91 | 240 | 68 | 10.0 | 28.99 |
| 6.0 | 116 | 60 | 152 | 10.4 | 27.11 |
| 9.0 | 72 | 21.5 | 24 | 9.8 | 27.08 |
| 9.0 | 72 | 169 | 38 | 10.6 | [2] 30.00 |
| 9.0 | 110 | 21.5 | 177 | | 25.24 |
| 9.0 | 110 | 169 | 164 | | 25.12 |
| 10.0 | 91 | 60 | 95 | 10.4 | 29.09 |

[1] Determined by gas chromatography of the trimethyl silyl ethers. Method adapted from the procedure of H. E. Brower et al., Anal. Chem. 38, 362 (1966).
[2] Yield of Methyl α-D-mannopyranoside also determined by crystallization (see Table 2a following).

With reference to Table 2, where indicated by a([2]) the methyl α-D-mannopyranoside was preferentially crystallized out of the final purified solution of methyl glycosides in accordance with the process of the invention and recovered. The yields obtained are listed in Table 2a along with the yield of residual mixed purified methyl glycosides remaining in the mother liquor after removal of said methyl α-D-mannopyranoside.

TABLE 2a.—YIELD OF PRODUCTS, PERCENT BY WEIGHT OF ORIGINAL DRIED PLANT MATERIAL SOLIDS

| Reaction Conditions Used in Glycosidation | | | Methyl α-D-Mannopyranoside Determined by— | | Mixed Methyl Glycosides |
|---|---|---|---|---|---|
| HCl Conc., percent | Temp., °C. | Time, minutes | Analysis | Crystallization | |
| 3 | 110 | 169 | 28.37 | 18.46 | 67.08 |
| 6 | 91 | 15 | 30.65 | 27.46 | 67.28 |
| 6 | 91 | 21.5 | 29.45 | 26.10 | 63.81 |
| 9 | 72 | 169 | 30.00 | 26.67 | 69.55 |

In the first three experiments listed in Table 2a the methyl α-D-mannopyranoside product was crystallized from aqueous methanol, however, in the fourth experiment this product was crystallized from an aqueous concentrate containing 75 percent solids. The concentrate was allowed to stand for two days at 0° C., following which the indicated yield of methyl α-D-mannopyranoside was recovered by filtering.

Example III

As previously pointed out efficient glycosidation requires at least 0.8 part by weight of methanolic solvent based on the weight of the starting solids used. This example illustrates the effect of the weight ratio of raw material solids to the solvent used on the yield of methyl α-D-mannopyranoside from the glycosidation reaction.

Using the process of Example II samples of the same type of spray-dried aqueous extract solids of southern pine wood were glycosidated at reflux temperatures with varying amounts of methanol containing 5 percent HCl. Test samples of the reaction product were removed at the end of 1 and 4 hour intervals for work-up and analysis.

In this example each test sample of the reaction mixture on removal from the reactor was centrifuged to remove and recover a methanol-insoluble fraction. The clarified liquid was then neutralized to pH7 with a methanolic-NaOH solution and the alcohol insoluble NaCl and other impurities filtered off. The filtrate was then vacuum concentrated to remove methanol leaving a viscous brown syrup of mixed crude methyl glycosides and impurities. This crude syrup was then treated with several volumes of water at about 55° C., and filtered to remove a brown water-insoluble fraction. The filtrate was then treated with a standard amount of activated carbon to remove additional color bodies. The result was an amber solution of mixed methyl glycosides. The methyl α-D-mannopyranoside content of this solution was determined by gas chromatography using the method referred to in Example II, Table 2. The results are set out in Table 3 which also includes the weight percent of impurities removed during the purification stages of treatment of the glycosidated reaction mixture.

TABLE 3

| Parts Solvent per Part Raw Material | Reaction Time, Hours | Weight Percent of Original Raw Material Solids | | |
|---|---|---|---|---|
| | | Methanol Insoluble Residue | Water Insoluble Fraction | Methyl α-D-Mannopyranoside Yield |
| 2.50 | 1 | 7.2 | 8.2 | 27.4 |
| | 4 | 5.0 | 8.0 | 31.3 |
| 1.25 | 1 | 7.9 | 7.1 | 18.6 |
| | 4 | 4.8 | 9.7 | 27.1 |
| 0.83 | 1 | 4.4 | 7.8 | 16.6 |
| | 4 | 1.4 | 8.7 | 25.7 |
| 0.62 | 1 | 8.0 | 5.0 | 6.3 |
| | 4 | 3.4 | 6.8 | 14.6 |

Example IV

In the "Masonite" hardboard process a commercial product known as "Masonex" is produced which is a high-pressure, high-temperature, aqueous extract of wood. A sample of this material dried by lyophilization (freeze drying) had the following composition:

TABLE 4

Color light brown,
Sulfated ash, percent 12.6
Sodium, percent 2.0

| Sugar | Monomeric Sugars, percent | Total Sugars After Hydrolysis, percent[1] |
|---|---|---|
| Galactose | 0.4 | 7.8 |
| Glucose | 1.4 | 11.4 |
| Mannose | 0.6 | 23.1 |
| Arabinose | 1.2 | 2.4 |
| Xylose | 1.4 | 14.6 |
| Total Sugars | 5.0 | 59.3 |

[1] Determined by the same method as referred to in Example I, Table 1.

The material was glycosidated and treated in the following manner. One part of the lyophilized "Masonex" and 4 parts of 6.0 percent methanolic hydrogen chloride were reacted at 91° C. for 30 minutes. The acidic reaction mixture was then cooled to slightly below 50° C., filtered while warm to remove a small amount of insoluble material and neutralized to pH 7 with an anion exchange resin. The clarified neutral solution was then evaporated to a thick syrup, diluted with approximately 1 volume of water at 55° C. and filtered to remove a dark-colored insoluble material amounting to about 10 percent of the original solids. The filtrate was decolorized with activated carbon, evaporated to a syrup and cooled. Inorganic salts (present in the raw material) precipitated at this point and were removed by filtration. The filtrate was again evaporated and then diluted with one volume of ethanol whereupon additional inorganic material precipitated and was filtered off. The clarified ethanol solution was then evaporated to a syrup and redissolved in methanol, cooled to 0° C., and seeded with a few crystals of methyl α-D-mannopyranoside. Methyl α-D-mannopyranoside preferentially crystallized out in the solution of methyl glycosides and was recovered in a 3.4 percent yield based on the original solids. An additional 1.5 percent was also recovered by evaporating the mother liquor to a syrup which was taken up in ethanol and the methyl α-D-mannopyranoside crystallized as before. The total yield of methyl α-D-mannopyranoside obtained, based on the original solids, was 4.9 percent.

Example V 1000 grams of spray-dried extract from southern pine wood chips similar to that used in Example I was added with stirring to 750 ml. of methanol containing 5.0 percent HCl and the mixture heated at reflux (66° C.) for four hours. The reaction mixture was cooled and neutralized to pH 7, filtered and vacuum concentrated to a viscous syrup. The syrup was then taken up in 3000 ml. of water and filtered to recover 78.5 grams of water insoluble brown colored material. The remaining solution was decolorized with 200 grams of activated carbon and vacuum evaporated to yield a dark amber colored viscous mixed glycoside product weighing 853 grams. Methyl α-D-mannopyranoside crystallized slowly from this product on standing at room temperature. 76 grams of methyl α-D-mannopyranoside having an M.P. of 190–192 was recovered. This corresponded to a yield of 7.6 percent methyl α-D-mannopyranoside.

We claim:

1. A process for producing a mixture of methyl glycosides from impure plant materials containing a mixture of carbohydrates including mannose or mannose polymers or copolymers, and recovering pure methyl α-D-mannopyranoside therefrom which comprises:
    (a) reacting said impure mannose-containing plant material with methanol in the presence of a mineral acid catalyst of the group consisting of hydrochloric acid and sulfuric acid under essentially anhydrous conditions at a temperature between about 66° C. to 116° C., for from about 15 to 300 minutes to convert the carbohydrates in said plant material to the corresponding methyl glycosides,
    (b) neutralizing the excess acid in the methyl glycoside-containing methanolic solution,
    (c) evaporating the neutral solution to a thick syrup and cooling it to a temperature below about 50° C.,
    (d) dissolving the cooled neutral methyl glycoside-containing syrup in water at about 55° C., and removing water-insoluble materials therefrom,
    (e) decolorizing the clarified solution with an adsorptive material and removing the adsorptive material,
    (f) concentrating the purified solution of methyl glycosides and cooling it to below about 30° C., to crystallize pure methyl α-D-mannopyranoside,
    (g) separating and recovering said crystals of pure methyl α-D-mannopyranoside and the residual mother liquor of purified methyl glycosides from which said methyl α-D-mannopyranoside is crystallized.

2. Process according to claim 1 in which the plant material is a conifer wood.

3. Process according to claim 1 in which the anhydrous methanol contains between about 2 and 10 percent by weight HCl as catalyst.

4. Process according to claim 1 in which the anhydrous methanol contains about 6 percent by weight HCl, and in which the glycosidation reaction is carried out at a temperature of about 90° C. for about 15 to 20 minutes.

5. Process according to claim 1 in which the anhydrous methanol contains between about 5.4 to 26.0 percent by weight of $H_2SO_4$ as catalyst.

6. Process according to claim 1 in which excess acid in the methyl glycoside-containing methanolic solution is neutralized with an alkali metal hydroxide and in which alcohol-insoluble inorganic salts precipitated from said solution are removed therefrom.

7. Process according to claim 1 in which the cooled neutral methyl glycoside-containing syrup is dissolved in from one to two volumes of water and removing water insoluble material therefrom.

8. Process according to claim 1 in which the purified aqueous solution of methyl glycosides is dehydrated, in which the resulting alcoholic solution is cooled to below about 30° C. to crystallize pure methyl α-D-mannopyranoside therefrom, and in which said pure crystals and the residual mother liquor of purified methyl glycosides are separated and recovered.

9. A process for producing a mixture of purified methyl glycosides from plant materials containing a water-soluble mixture of impure carbohydrates which comprises:
    (a) reacting said plant material with methanol in the presence of a mineral acid catalyst of the group consisting of hydrochloric acid and sulfuric acid under essentially anhydrous conditions at a temperature between about 66° C. and 116° C., for from about 15 to 300 minutes to convert the carbohydrates in said plant material to the corresponding methyl glycosides,
    (b) neutralizing the excess acid in the methyl glycoside-containing methanolic solution,
    (c) evaporating the neutral solution to a thick syrup and cooling it to a temperature below about 50° C.,
    (d) dissolving the cooled neutral methyl glycoside-containing syrup in water at about 55° C., and removing water-insoluble materials therefrom,
    (e) recovering the resulting purified mixture of methyl glycosides.

References Cited

UNITED STATES PATENTS

| | | | |
|---|---|---|---|
| 2,276,621 | 3/1942 | Langlois | 260—210 |
| 2,350,295 | 5/1944 | Stoll et al. | 260—10 |
| 2,390,507 | 12/1945 | Cantor | 260—210 |
| 3,240,775 | 3/1966 | Schweiger | 260—209 |

ELBERT L. ROBERTS, Primary Examiner

UNITED STATES PATENT OFFICE
CERTIFICATE OF CORRECTION

Patent No. 3,507,853　　　　　　　　　　　　　　April 21, 1970

John Kelvin Hamilton et al.

It is certified that error appears in the above identified patent and that said Letters Patent are hereby corrected as shown below:

Column 1, line 40, "mixture" should read -- mixed --. Column 7, line 74, "to" should read -- and --. Column 8, line 41, after "dehydrated," insert -- in which the purified methyl glycosides are dissolved in alcohol, --.

Signed and sealed this 22nd day of December 1970.

(SEAL)

Attest:

Edward M. Fletcher, Jr.

Attesting Officer

WILLIAM E. SCHUYLER, JR.

Commissioner of Patents